US006852929B2

(12) United States Patent
Scudder

(10) Patent No.: US 6,852,929 B2
(45) Date of Patent: Feb. 8, 2005

(54) ELASTOMER SEAL AND HOUSING FOR A REMOTE KEYLESS ENTRY DEVICE

(75) Inventor: William H. Scudder, Ferndale, MI (US)

(73) Assignee: Lear Corporation, Southfield, MI (US)

( * ) Notice: Subject to any disclaimer, the term of this patent is extended or adjusted under 35 U.S.C. 154(b) by 130 days.

(21) Appl. No.: 10/307,111

(22) Filed: Nov. 27, 2002

(65) Prior Publication Data

US 2004/0099430 A1 May 27, 2004

(51) Int. Cl.[7] .................................................. H02G 3/14
(52) U.S. Cl. ............................ 174/66; 174/67; 220/241
(58) Field of Search ..................... 174/66, 67; 220/241, 220/242; D8/353; D13/177

(56) References Cited

U.S. PATENT DOCUMENTS 4,560,083 A * 12/1985 Danico ....................... 220/786
6,563,047 B2 * 5/2003 Lambiaso .................... 174/50
6,608,253 B1 * 8/2003 Rintz .......................... 174/66

* cited by examiner

*Primary Examiner*—Dhiru R. Patel
(74) *Attorney, Agent, or Firm*—Bill C. Panagos

(57) ABSTRACT

An automotive keyless entry device 10 is provided, including a first cover element 12 including a tongue element 30 including a plurality of outwardly projecting locking tabs 32 positioned along a first cover intermediary perimeter 34. A second cover element 14 includes a groove element 62 and a plurality of inwardly projecting locking tabs 64 positioned along a second cover outer perimeter 66. The plurality of inwardly projecting locking tabs 64 engage the plurality of outwardly projecting locking tabs 32 during assembly. The second cover element 14 includes an inner seal wall 70 positioned internally of the groove element 62 and the plurality of inwardly projecting locking tabs 64. An elastomer seal element 26 includes an alternating plurality of fold-over portions 46 and plurality of lock-seal portions 48. The elastomer seal element 26 is positioned between the first cover element 12 and the second cover element 14 such that the plurality of fold-over portions 46 surround the tongue element 30 sealing the tongue element 30 to the inner seal wall 70 and the plurality of lock-seal portions 48 seal the plurality of outwardly projecting locking tabs 32 to the inner seal wall 70. The plurality of lock-seal portions 48 exert sealing forces on the plurality of outwardly projecting locking tabs 32 in primarily a lateral engagement direction 78.

20 Claims, 3 Drawing Sheets

ELASTOMER SEAL AND HOUSING FOR A REMOTE KEYLESS ENTRY DEVICE

TECHNICAL FIELD

The present invention relates generally to an automotive remote keyless entry device housing and elastomer seal assembly and more specifically to an automotive remote keyless entry device assembly with improved seal integrity and improved assembly durability.

BACKGROUND OF THE INVENTION

Modern automotive vehicle design is often influenced by a desire to provide more convenience to passengers and vehicle owners. Automation and extended utility quickly move from novel option to expected standards. Such is the case with remote keyless entry systems. Wherein automatic windows and locks have moved into semi-standard options, so to has their remote operation through the use of portable hand-held transmitters. Likewise, the utility provided by such portable hand-held transmitters has been extended to include features such as security system activation, door and hatch opening/closing, panic alarm activation, and automotive light activation.

The portable transmitters commonly operate through the use of radio frequency transmitters positioned within tiny hand-held devices. Often these transmitters are carried by a person in a key, key fob, or other miniature containment. As these transmitters have expanded in utility, they have also expanded in perceived necessity by consumers. Therefore, the designs must function consistently throughout extended periods of operation. They must, therefore, be robust enough such then when subjected to a wide variety of punishing environments they remain operational. This typically includes sealing the transmitter, electronics, and battery supply within the transmitter housing.

Although current sealing arrangements commonly serve to adequately prevent moisture from damaging the internal components of the transmitter, they often present considerable challenges when exposed to punishing environments. Assemblies are often dropped, impacted, or jarred and must retain their design benefits after exposure to these effects. Often seal designs, however, exert forces on the housing counter to the snap retaining mechanisms. This can result in disengagement of the housing assembly as a result of such impacts or if the housing sections are not completely engaged. Furthermore, misalignment of the seal during assembly can exacerbate the forces on the housing sections making assembly virtually impossible without disassembly and realignment of the seal. Thus considerable time and effort is often exhausted during assembly of remote keyless transmitters due to design characteristics and alignment of the seal element.

It would therefore be highly desirable to have an automotive remote keyless entry device with an improved elastomer seal design such that assembly integrity is improved. It would further be highly desirable to develop an automotive keyless entry device wherein proper alignment of the elastomer seal during assembly could be insured such that the time and effort required to assemble the device housing is minimized.

SUMMARY OF THE INVENTION

It is therefore an object to the present invention to provide an automotive keyless entry device with improved assembly integrity. It is further object to the present invention to provide an automotive keyless entry device with improved seal alignment.

In accordance with the objects of the present invention an automotive keyless entry device is provided. The automotive keyless entry device includes a first cover element. The first cover element includes tongue element including a plurality of outwardly projecting locking tabs positioned along a first cover outer perimeter. A second cover element includes a groove element including a plurality of inwardly projecting locking tabs positioned along a second cover outer perimeter. The inwardly projecting locking tabs engaging the outwardly projecting locking tabs to secure the first cover element to the second cover element. The second cover element further includes an inner seal wall positioned internally of the groove element and plurality of inwardly projecting locking tabs. An elastomer seal element having alternating fold-over portions and lock-seal portions is positioned between the first cover element and the second cover element. The elastomer seal element is positioned such that the plurality of fold-over portions surround the tongue element and create a seal between the tongue element and the inner seal wall. The plurality of lock seal portions are positioned such that they create a seal between the plurality of outwardly projecting locking tabs and the inner seal wall. The plurality of lock seal portions exerting a seal-force on the plurality of outwardly projecting locking tabs primarily in a lateral engagement direction.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
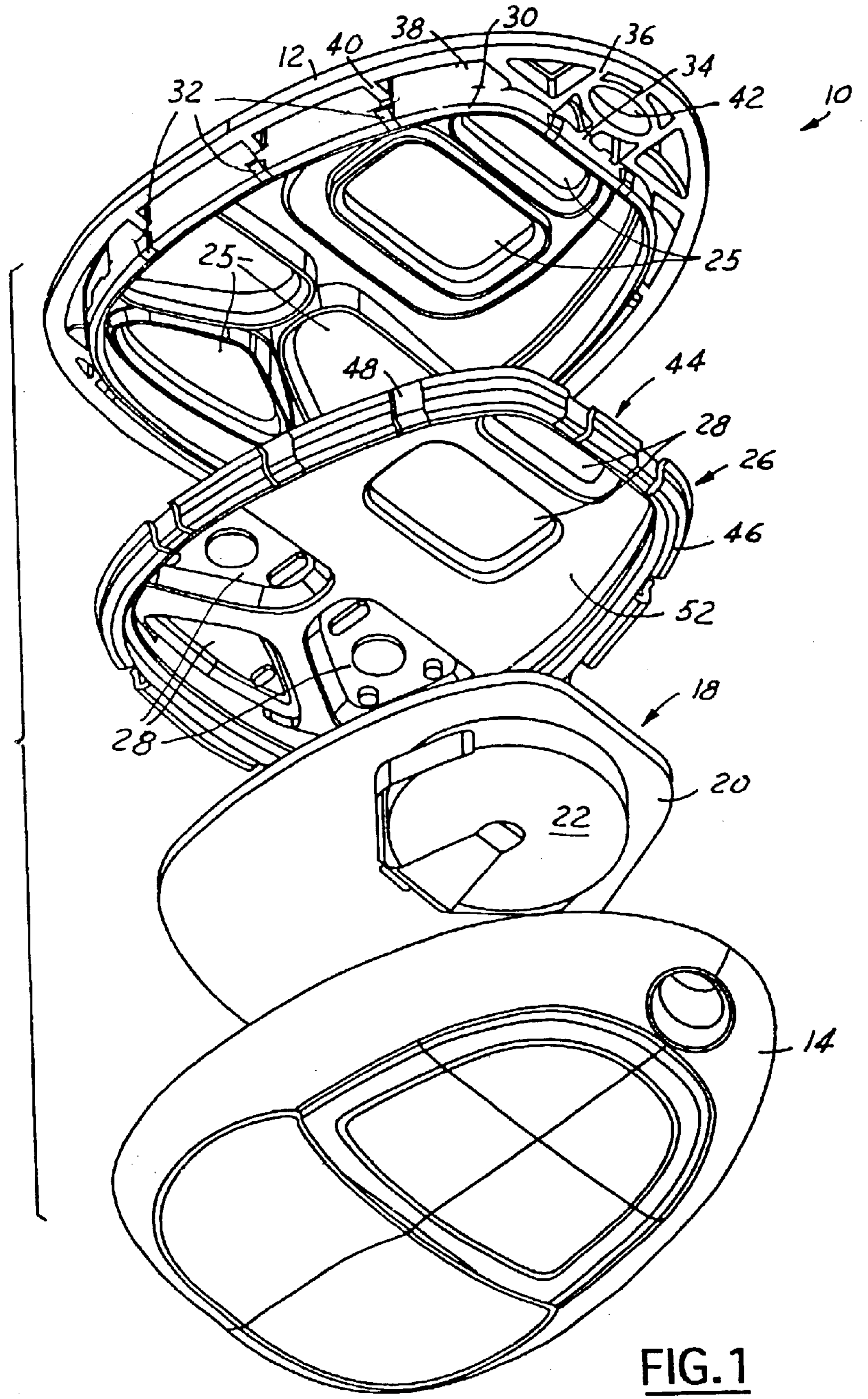
FIG. 1 is an exploded illustration of an automotive keyless entry device in accordance with the present invention.

Referring now to FIG. 1, which is an exploded view illustration of an automotive keyless entry device 10 in accordance with the present invention. The keyless entry device 10 is intended to be applicable to a wide variety of automotive utilities including, but not limited to, alarm activation/deactivation, vehicle lock/unlock, automatic door/trunk opening, and panic alarm settings. The keyless entry device 10 is preferably sized such that it can be easily stored and transported within a customer's pocket or purse. In one particular embodiment, as illustrated, the keyless entry device 10 is contemplated to take the form of a key-fob style device.

Figure 2:
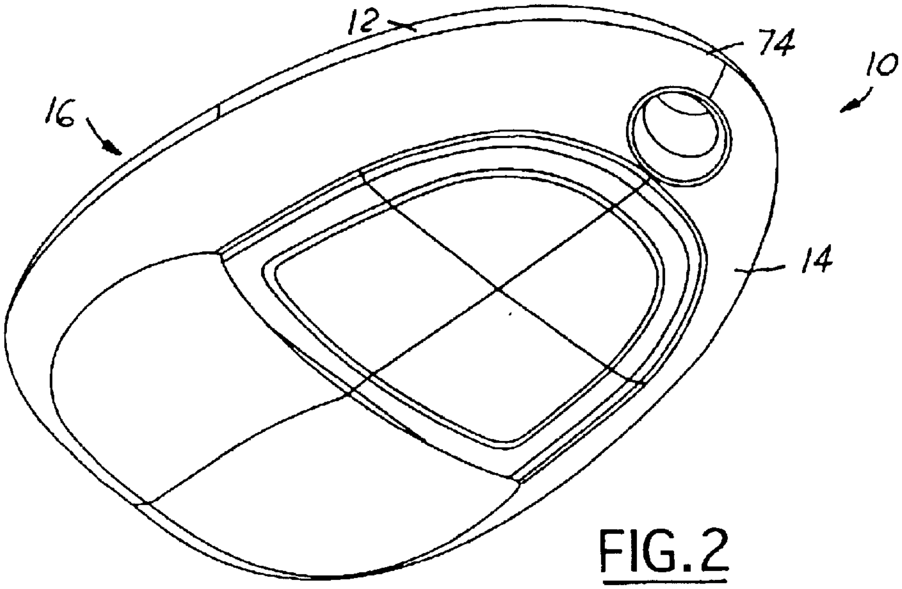
FIG. 2 is an assembled illustration of the automotive keyless entry device shown in FIG. 1.
Figure 3:
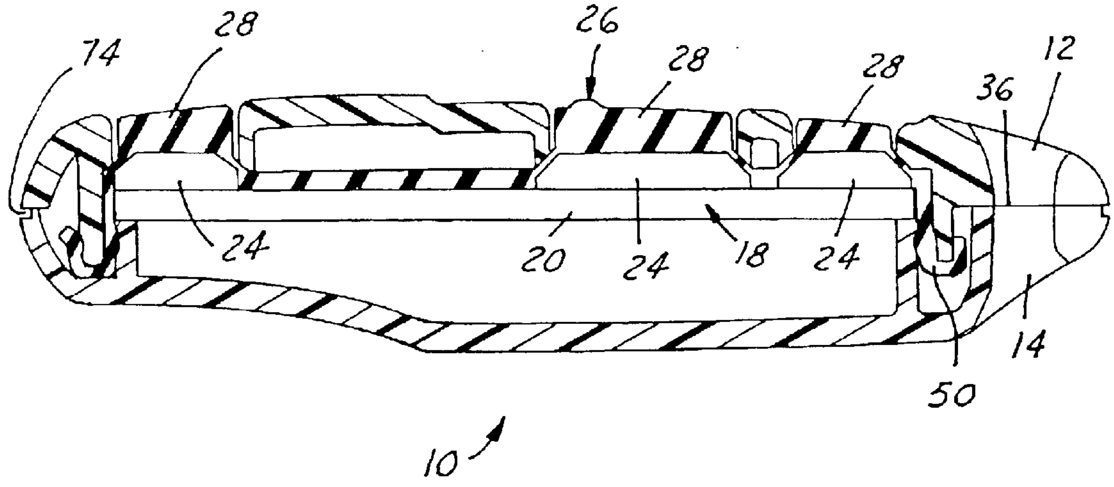
FIG. 3 is a cross-sectional illustration of the automotive keyless entry device illustrated in FIG. 2, the cross section taken along the lines 3—3 in the direction of the arrows.

The automotive keyless entry device 10 includes a first cover element 12 and a second cover element 14. Although these cover elements 12,14 may take on a variety of forms and configurations, in the illustrated embodiment they represent a top cover 12 and a bottom cover 14. The first and second cover elements 12,14 are combinable to form a housing 16 (see FIG. 2) utilized to house and protect the transmitter assembly 18. The transmitter assembly 18 is intended to encompass a wide variety of components, although a circuit board 20 and battery 22 assembly is illustrated. A plurality of button elements 24 positioned on the circuit board 20 (see FIG. 3) provide functionality to the transmitter assembly 18. As discussed, these functions are contemplated to take on a variety of functions alone and in combination with systems installed in the automobile. Door unlock, lock, trunk, and alarm activation are only an example of the features accessible through the transmitter assembly 18.

A plurality of button apertures 25 are formed in the first cover element 12 to provide an operator with access to the button elements 24 of the transmitter assembly 18. Although the transmitter assembly 18 may be formed and assembled in a variety of known fashions and configurations, it is commonly desirable to protect the transmitter assembly 18 from outside dirt and moisture. For many transmitter assemblies 18, exposure to fluids can cause a shorting of the transmitter 18, undue wear on the button elements 24, a no make condition, or premature discharging of the battery 22. For this reason the present invention includes an elastomer seal element 26 positioned between the transmitter assembly 18 and the first cover element 12. The elastomer seal element 26 includes a plurality of button face protrusions 28 shaped to fill the plurality of button apertures 26. In this fashion, the transmitter assembly 18 is protected from dirt and moisture entering through the button apertures 25. Additionally, a comfortable button pad 30 is thereby provided for interaction with the user.

Although infiltration of dirt and moisture through the button apertures 25 is one concern, an additional concern stems from infiltration of dirt and moisture in the area where the first cover element 12 joins the second cover element 14. Existing methodologies for attaching the cover elements 12,14 and sealing them often make assembly difficult. The present invention introduces a novel approach to the interaction of the first cover element 12, the second cover element 14, and the elastomer seal element 26 that provides improvement over prior designs. The present design extends the elastomer seal element 26 to seal a unique engagement of the first cover element 12 and second cover element 14 such that the keyless entry device 10 has improved seal alignment and improved engagement integrity.

Figure 4:
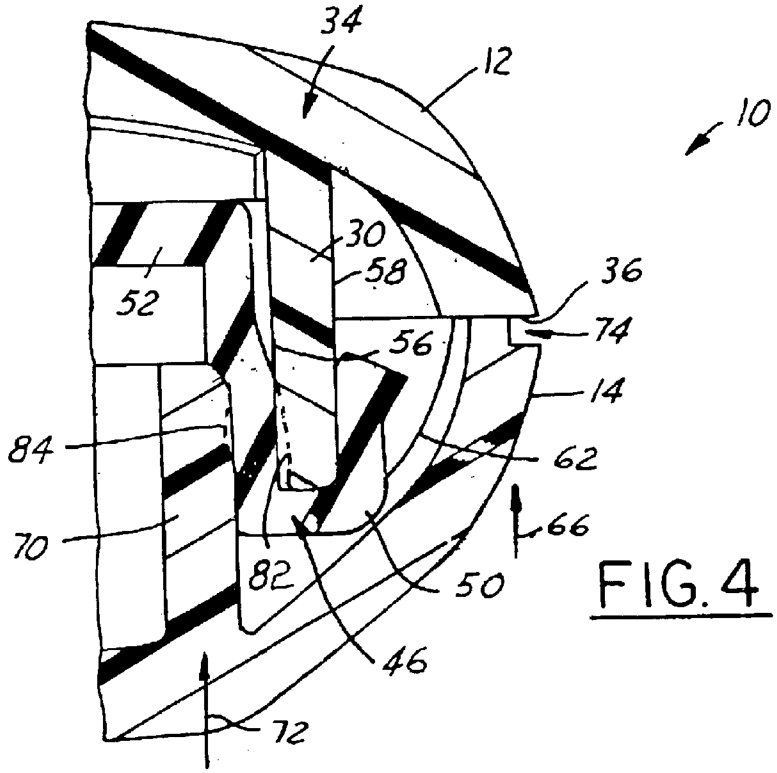
FIG. 4 is a cross-sectional illustration of a portion of the automotive keyless entry device illustrated in FIG. 2, the cross-section taken along the line 4—4 in the direction of the arrows.
Figure 5:
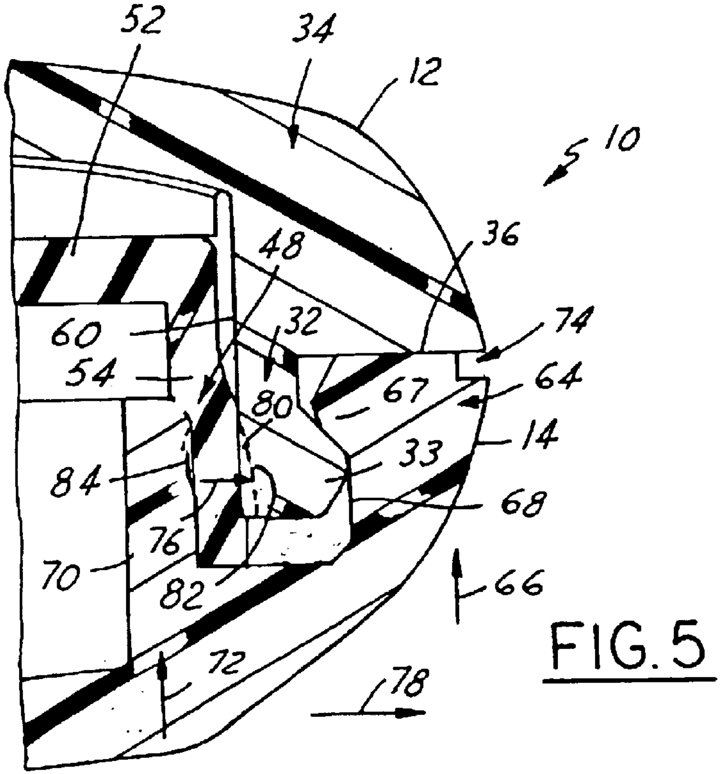
FIG. 5 is a cross-sectional illustration of a portion of the automotive keyless entry device illustrated in FIG. 2, the cross-section taken along the line 5—5 in the direction of the arrows.

As a portion of this unique design, the first cover element 12 includes a tongue element 30 including a plurality of outwardly projecting locking tabs 32 (see FIGS. 4 and 5). These elements are formed along a first cover intermediary perimeter 34 of the first cover element 12. Although the tongue element 30 and projecting locking tabs 32 can be formed in a variety of shapes and configurations, one embodiment contemplates forming the outwardly projecting locking tabs 32 by forming a plurality of outwardly projecting knubs 33 on portions of a continuous tongue element 30 such that the first cover intermediary perimeter 34 is effectively broken down into an alternating plurality of tongue elements 30 and outwardly projecting locking tabs 32. A first element planar portion 36 can extend outwards from the first cover intermediary perimeter 34 to form a flush surface for communication with the second cover element 14 after assembly to provide the keyless entry device 10 with a smooth exterior. A plurality of alternating core out portions 38 and support ribs 40 can be formed into the first element planar portion 36. The core out portions 38 and support ribs 40 can be utilized such that the first cover element 12 has sufficient structural rigidity while minimizing the weight and material costs of the first cover element 12. In addition, the combination of core out portions 38 and support ribs 40 helps prevent sinks that may mar the appearance of the automotive keyless entry device 10. Additional features such as an upper key-ring passage 42 can additionally be formed in the first element planar portion 36 such that the keyless entry device 10 may be easily mounted to a key-ring after assembly.

The elastomer seal element 26 extends from the plurality of button face protrusions 28 to an outer seal perimeter 44. The outer seal perimeter 44 is designed such that it forms an alternating plurality of fold-over portions 46 and lock-seal portions 48. The plurality of fold-over portions 46 form a generally u-shaped vertical extension 50 from the seal face 52. The lock-seal portions 48 form a generally flat vertical extension 54 from the seal face 52. It is contemplated that the fold-over portions 46 and lock-seal portions 48 may be formed in a variety of shapes and configurations. One embodiment contemplates forming a contiguous fold-over portion 46 and cutting off portions to form the lock-seal portions 48. Other embodiments contemplate forming the fold-over portions 46 and lock-seal portions 48 independently.

The fold-over portions 46 and lock-seal portions 48 are complimentary to the tongue element 30 and outwardly projecting locking tabs 32 of the first cover element 12. In this fashion, when the elastomer seal element 26 is positioned on the first cover element 12, the fold-over portions 46 surround the tongue element 30, wrapping around the inside tongue element surface 56 to the outside tongue element surface 58. This provides the added quality to the present invention wherein the elastomer seal element 26 can be secured to the first cover element 12 by way of the fold-over portions 46 and thereby remain properly orientated relative to the first cover element 12 during assembly. This reduces the possibility of misalignment of the elastomer seal element 26 and reduces manufacturing difficulties. The lock-seal portions 48 are formed such that they are positioned adjacent the inside top-cover projecting tab surface 60 to provide beneficial sealing qualities as will be discussed later.

The second cover element 14 also contains unique features that serve to benefit from the design of the elastomer seal element 26. The second cover element 14 includes a groove element 62 (see FIG. 4) including a plurality inwardly projecting locking tabs 64 (second locking tabs) (see FIG. 5) positioned along a second cover outer perimeter 66. The groove element 62 and inwardly projecting locking tabs 64 are complimentary to the tongue element 30 and outwardly projecting locking tabs 32 (first locking tabs) of the first cover element 12. Although the groove element 62 and inwardly projecting locking tabs 64 can be formed in a variety of configurations and methods, one embodiment contemplates the inwardly projecting locking tabs 64 including an inwardly projecting knub 67 formed on the groove outer surface 68. The second cover element 14 also includes an inner second cover seal wall 70 formed around a second cover intermediary perimeter 72. The second cover seal wall 70 is positioned internally of the groove element 62 and inwardly projecting locking tabs 64. In addition to serving as an inner wall for the groove element 62, the second cover seal wall 70 can additionally serve as a structural support for the transmitter assembly 18.

Although assembly can be accomplished through a variety of procedures and processes, one embodiment contemplates placing the elastomer seal element 26 into the first cover element 12. The transmitter assembly 18 is placed into the elastomer seal element 26. The second cover element 14 is placed on top of the seal element 26/first cover element 12 combination and the assembly is pressed together. The tongue element 30 penetrates down through the groove element 62 and the fold-over portions 46 form a seal between the tongue element 30 and the second cover seal wall 70. Similarly, the outwardly projecting locking tabs 32 of the first cover element 12 engage the inwardly projecting locking tabs 64 of the second cover element 14. This serves to secure the first cover element 12 to the second cover element 14 such that the automotive keyless entry device 10 is securely assembled. At the same time, the plurality of lock-seal portions 48 create a seal between the plurality of outwardly projecting locking tabs 32 and the second cover seal wall 70. This ensures the outside assembly perimeter 74 is properly sealed.

It should be noted that the shape and position of the lock-seal portions 48 are such that the sealing forces 76 on the outwardly projecting locking tabs 32 are substantially in a lateral engagement direction 78. This encourages engagement of the outwardly projecting locking tabs 32 and the inwardly projecting locking tabs 64. This assists the engagement of the locking tabs 32,64 and resists disengagement during impact. This not only improves engagement resiliency but helps guarantee proper assembly and engagement of the locking tabs 32,64.

The present invention can further include a variety of additional features that improve resiliency. The present invention can further include a outer elastomer protrusion 80 formed on the elastomer element 26 such that it engages the rear knub face 82 of the outwardly projecting locking tabs 32. The outer elastomer protrusion 80 compresses during assembly to improve the seal between the elastomer element 26 and the outwardly projecting locking tabs 32. The present invention can also include an inner elastomer protrusion 84 formed on elastomer element 26 such that it engages the second cover seal wall 70. This allows the elastomer seal element 26 compress to improve the seal between the elastomer element 26 and the second cover seal wall 70. It should be understood that these protrusion features 80,84 may be used independently or in combination. Additionally, the outer elastomer protrusion 80 may be used alone or in combination with the inner elastomer protrusion can improve sealing between the tongue element 30 and the second cover seal wall 70.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An automotive keyless entry device comprising:

a first cover element including a tongue element including a plurality of outwardly projecting locking tabs positioned along a first cover intermediary perimeter;

a second cover element including a groove element including a plurality of inwardly projecting locking tabs positioned along a second cover outer perimeter, said plurality of inwardly projecting locking tabs engaging said plurality of outwardly projecting locking tabs during assembly, said second cover element including an inner seal wall positioned internally of said groove element and said plurality of inwardly projecting locking tabs; and an elastomer seal element including an alternating plurality of fold-over portions and plurality of lock-seal portions, said elastomer seal element positioned between said first cover element and said second cover element such that said plurality of fold-over portions surround said tongue element sealing said tongue element to said inner seal wall and said plurality of lock-seal portions seal said plurality of outwardly projecting locking tabs to said inner seal wall;

wherein said plurality of lock-seal portions exert sealing forces on said plurality of outwardly projecting locking tabs in primarily a lateral engagement direction.

2. An automotive keyless entry device as described in claim 1, further comprising:

a transmitter assembly positioned between said elastomer seal element and said second cover element.

3. An automotive keyless entry device as described in claim 2, further comprising:

a plurality of button elements mounted to said transmitter assembly, said plurality of button elements aligned with a plurality of button apertures formed in said first cover element; and a plurality of button face protrusions formed into said elastomer seal element, said plurality of button face protrusions positioned between said plurality of button elements and said plurality of button aperatures.

4. An automotive keyless entry device as described in claim 2, wherein said inner seal wall provides structural support for said transmitter assembly.

5. An automotive keyless entry device as described in claim 1, further comprising:

a first element planar portion extending outwards from said first cover intermediary perimeter, said first element planar portion including an alternating plurality of core out portions and plurality of support ribs.

6. An automotive keyless entry device as described in claim 1, further comprising:

an outer elastomer protrusion formed on said elastomer element, said outer elastomer protrusion engaging a rear knub face of said outwardly projecting locking tabs, said outer elastomer protrusion compressing against said rear knub face.

7. An automotive keyless entry device as described in claim 6, wherein said outer elastomer protrusion compresses against said tongue element.

8. An automotive keyless entry device as described in claim 1, further comprising:

an inner elastomer protrusion formed on said elastomer element, said inner elastomer element engaging said inner seal wall, said inner elastomer protrusion compressing against said inner seal wall.

9. An automotive keyless entry device as described in claim 1, wherein said plurality of fold-over portions comprises comprise u-shaped vertical extensions from a seal face of said elastomer seal element.

10. An automotive keyless entry device as described in claim 1, wherein said plurality of lock-seal portions comprises comprise flat vertical extensions from a seal face of said elastomer seal element.

11. An electronic device comprising:

a first cover element including a of tongue element including plurality of outwardly projecting locking tabs positioned along a first cover intermediary perimeter;

a second cover element including a groove element including a plurality of inwardly projecting locking tabs positioned along a second cover outer perimeter, said plurality of inwardly projecting locking tabs engaging said plurality of outwardly projecting locking tabs during assembly, said second cover element including an inner seal wall positioned internally of said groove element and said plurality of inwardly projecting locking tabs; and an elastomer seal element including an alternating plurality of fold-over portions and plurality of lock-seal portions, said elastomer seal element positioned between said first cover element and said second cover element such that said plurality of fold-over portions seal said tongue element to said inner seal wall and said plurality of lock-seal portions seal said plurality of outwardly projecting locking tabs to said inner seal wall;

wherein said plurality of fold-over portions comprises comprise u-shaped vertical extensions from a seal face of said elastomer seal element, said u-shaped vertical extensions engaging said tongue element to secure said elastomer element to said first cover element during assembly.

12. An electronic device as described in claim 11, wherein said plurality of lock-seal portions exert sealing forces on said plurality of outwardly projecting locking tabs in primarily a lateral engagement direction.

13. An electronic device as described in claim 11, further comprising:

a transmitter assembly positioned between said elastomer seal element and said second cover element.

14. An electronic device as described in claim 13, further comprising:

a plurality of button elements mounted to said transmitter assembly, said plurality of button elements aligned with a plurality of button apertures formed in said first cover element; and a plurality of button face protrusions formed into said elastomer seal element, said plurality of button face protrusions positioned between said plurality of button elements and said plurality of button aperatures.

15. An electronic device as described in claim 13, wherein said inner seal wall provides structural support for said transmitter assembly.

16. An electronic device as described in claim 11, further comprising:

a first element planar portion extending outwards from said first cover intermediary perimeter, said first element planar portion including an alternating plurality of core out portions and plurality of support ribs.

17. An electronic device as described in claim 11, further comprising:

an outer elastomer protrusion formed on said elastomer element, said outer elastomer protrusion engaging a rear knub face of said outwardly projecting locking tabs, said outer elastomer protrusion compressing against said rear knub face.

18. An electronic device as described in claim 11, further comprising:

an inner elastomer protrusion formed on said elastomer element, said inner elastomer element engaging said inner seal wall, said inner elastomer protrusion compressing against said inner seal wall.

19. An electronic device as described in claim 11, wherein said plurality of lock-seal portions comprises comprise flat vertical extensions from a seal face of said elastomer seal element.

20. An electronic device comprising:

a first cover element including a of tongue element including plurality of first locking tabs positioned along a first cover intermediary perimeter;

a second cover element including a groove element including a plurality of second locking tabs positioned along a second cover outer perimeter, said plurality of second locking tabs engaging said plurality of first locking tabs during assembly, said second cover element including an inner seal wall positioned internally of said groove element and said plurality of second locking tabs; and an elastomer seal element including an alternating plurality of fold-over portions and plurality of lock-seal portions, said elastomer seal element positioned between said first cover element and said second cover element such that said plurality of fold-over portions seal said tongue element to said inner seal wall and said plurality of lock-seal portions seal said plurality of first locking tabs to said inner seal wall;

wherein said plurality of fold-over portions comprises comprise u-shaped vertical extensions from a seal face of said elastomer seal element, said u-shaped vertical extensions engaging said tongue element to secure said elastomer element to said first cover element during assembly.

* * * * *